Feb. 8, 1944.                F. HAUSER                2,341,041
                        PERIODIC DISTRIBUTING VALVE
                  Original Filed July 11, 1938    4 Sheets-Sheet 1
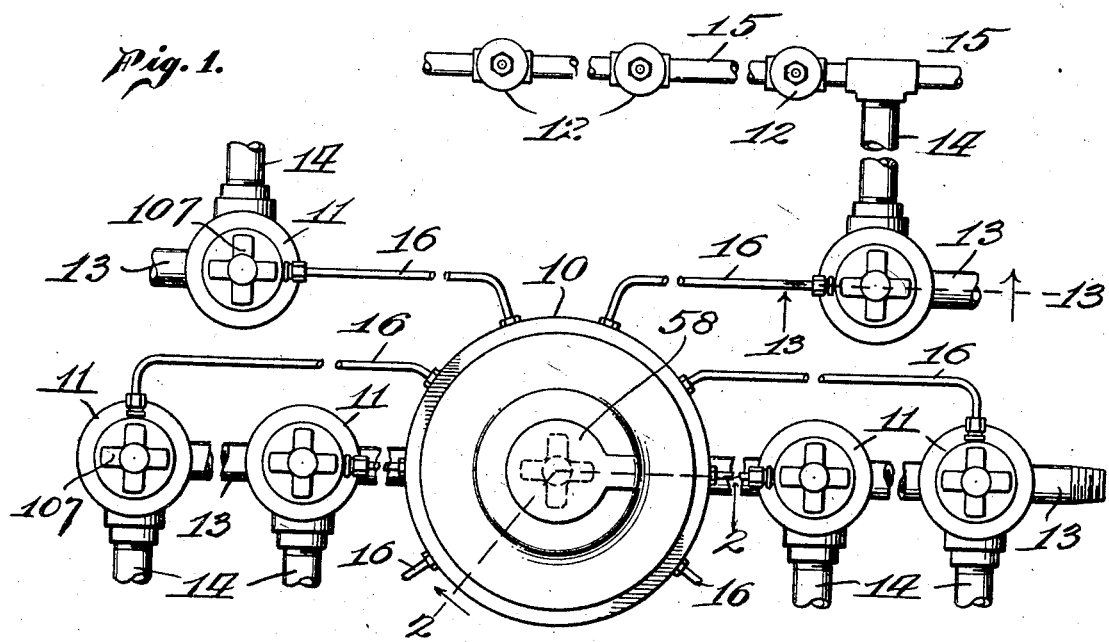
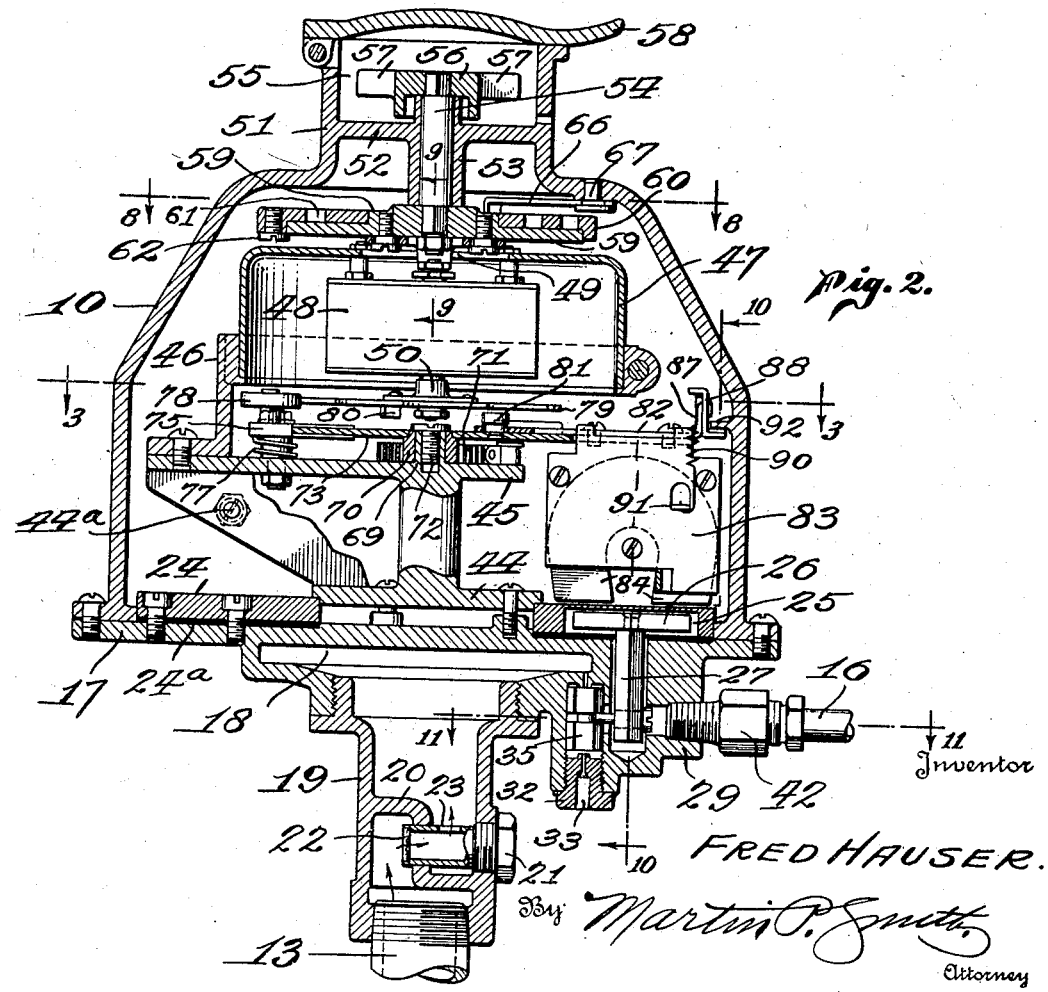
Inventor
FRED HAUSER.
By Martin P. Smith
Attorney

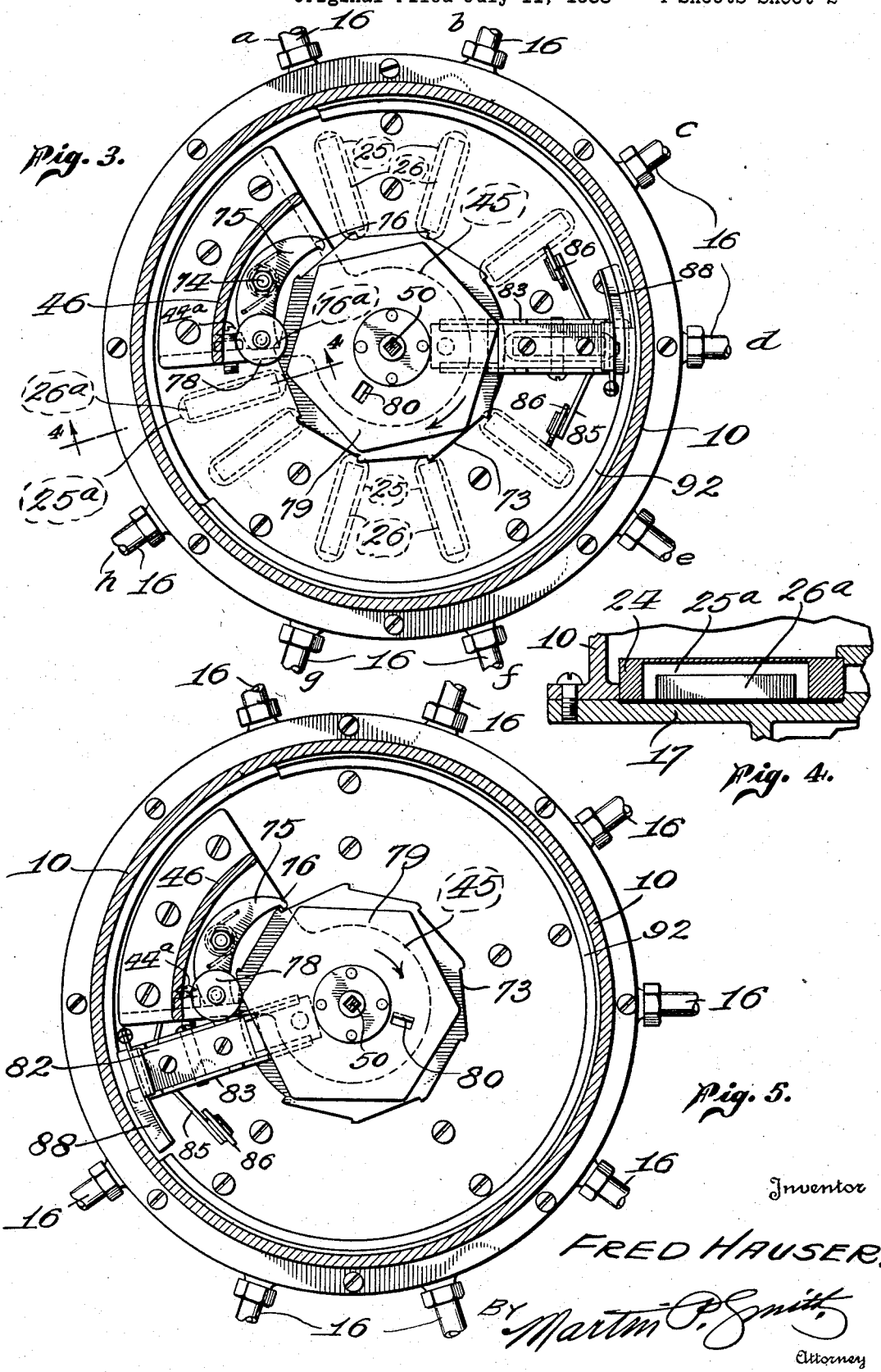

Feb. 8, 1944.  F. HAUSER  2,341,041
PERIODIC DISTRIBUTING VALVE
Original Filed July 11, 1938    4 Sheets-Sheet 3

Inventor
FRED HAUSER.
By Martin P. Smith,
Attorney

Feb. 8, 1944.                F. HAUSER                2,341,041
PERIODIC DISTRIBUTING VALVE
Original Filed July 11, 1938     4 Sheets—Sheet 4
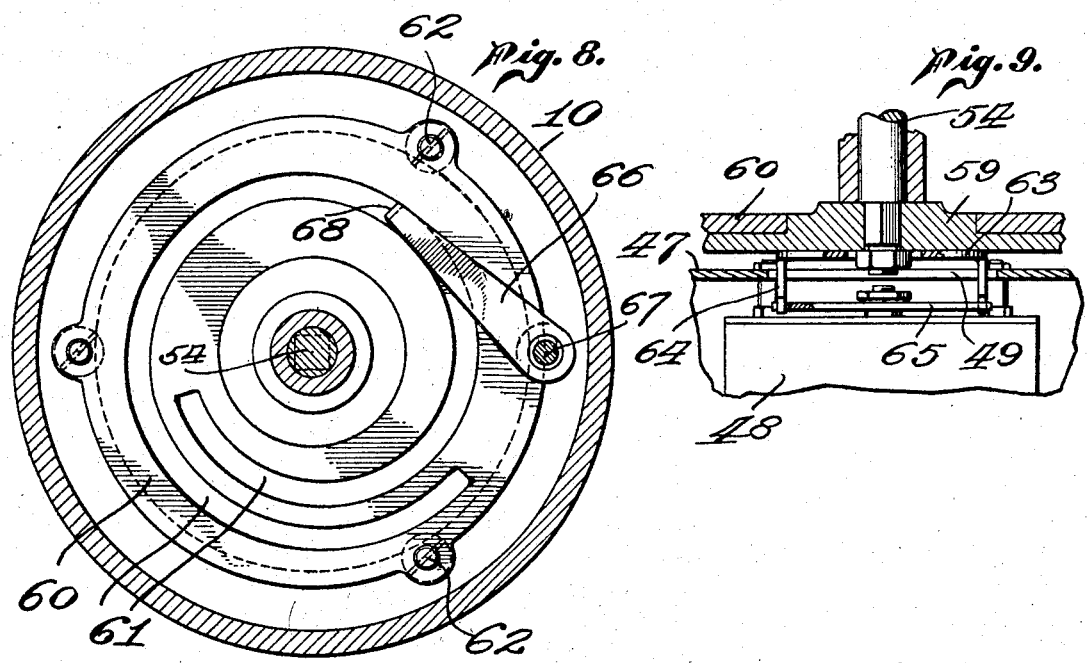
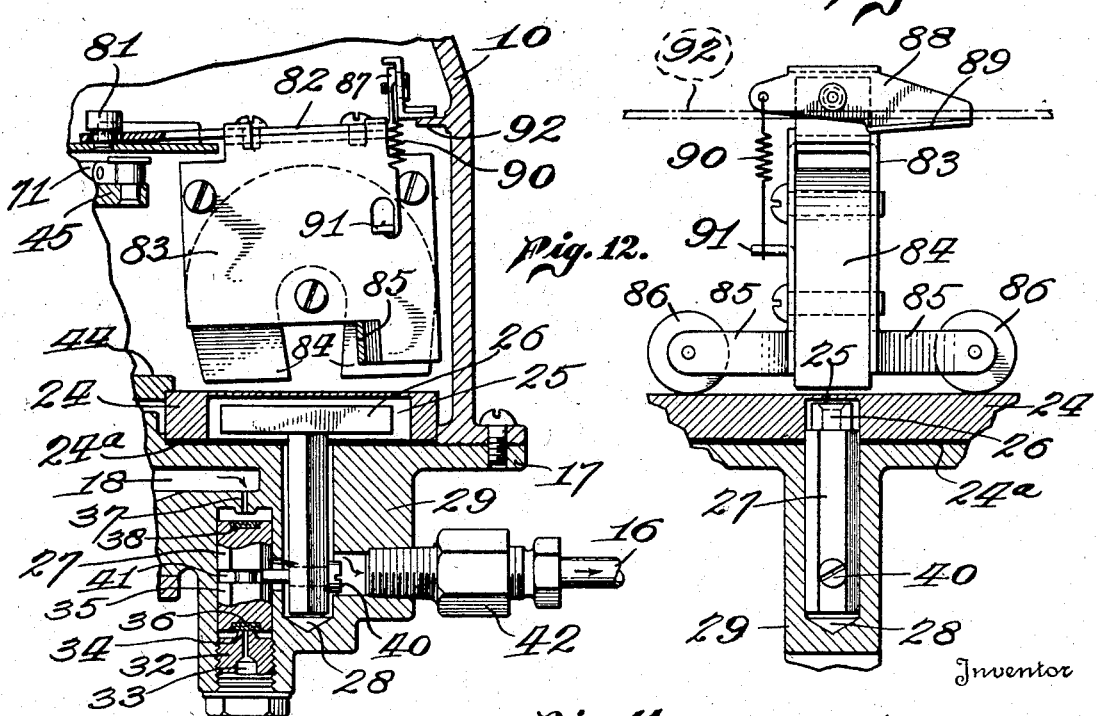
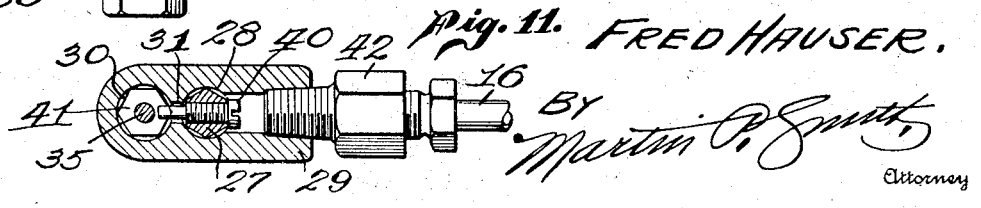
Inventor
FRED HAUSER,
By Martin P. Smith,
Attorney Patented Feb. 8, 1944

2,341,041

UNITED STATES PATENT OFFICE 2,341,041

PERIODIC DISTRIBUTING VALVE

Fred Hauser, West Los Angeles, Calif.

Substituted for abandoned application Serial No. 218,524, July 11, 1938. This application October 15, 1941, Serial No. 415,079

5 Claims. (Cl. 137—145)

My invention relates to sprinkling systems of the time controlled type and which are generally used for sprinkling lawns, gardens, orchards, golf courses, parks, and the like, and the principal objects of my invention are, to generally improve upon and simplify the existing forms of periodic time controlled distributing valves employed in such systems, that will be effective in sequentially actuating a series of valves, each of which controls the flow of water from a main or other source of supply, to a plurality of sprinkler heads, the latter being arranged so as to distribute water over a pre-determined ground area and the distributing valve acting to periodically operate in succession, the valves that control the operation of the sprinkler heads and which successive operation of the valves occurs at controlled predetermined time intervals.

Thus, each valve that controls the operation of a series of sprinkler heads, is opened to permit the flow of water to all of the heads in the series controlled by the opened valve and each valve being closed after a pre-determined lapse of time, such actions being repeated for each valve of the system, so that the ground areas covered by the various sets of sprinkler heads are sprinkled in succession for corresponding time intervals, thus assuring uniform distribution of the sprinkling water over the ground surface covered by the system.

A further object of my invention is, to provide a distributing valve that does not involve intricate and expensive electrically operated timing devices, underground electrical wiring, electrically operated valves and conventional glands or stuffing boxes that are nearly always more or less troublesome and inefficient.

Further objects of my invention are, to provide a distributing valve of the character referred to, that may be set or placed in condition to begin the sprinkling function, by the turning of a wheel, or other member connected to the main operating shaft of the control mechanism.

A further object of my invention is, to provide a distributing valve wherein the sequential actuation of the valves that control the operation of the sets of sprinkler heads are controlled by valvular means actuated by a moving permanent magnet and the operation of said magnet being controlled by a clock mechanism or the like.

This application is a substitute for an application on the same invention filed by me July 11, 1938, Serial Number 218,524.

With the foregoing and other objects in view, my invention consists in certain novel features of construction and arrangement of parts that will be hereinafter more fully described and claimed and illustrated in the accompanying drawings in which:

Fig. 1 is a top plan view of the complete system with parts broken away.

Fig. 2 is an enlarged vertical cross section taken on the line 2—2 of Fig. 1.

Fig. 3 is a horizontal section taken on the line 3—3 of Fig. 2.

Fig. 4 is an enlarged detail section taken on the line 4—4 of Fig. 3.

Fig. 5 is a horizontal section similar to Fig. 3 and showing the position of the operating parts of the control mechanism in the positions occupied while inactive, or out of service.

Fig. 8 is a horizontal section taken on the line 8—8 of Fig. 2.

Fig. 9 is an enlarged detail section taken on the line 9—9 of Fig. 2.

Fig. 10 is an enlarged vertical section taken on the line 10—10 of Fig. 2.

Fig. 11 is a horizontal section taken on the line 11—11 of Fig. 2.

Fig. 12 is an enlarged detail section of one of the magnet actuated valves that control the flow of water from the automatic control housing to the conduits that lead to the sprinkler head control valves with the magnet in raised position so that it does not affect the armature that is connected to the valve.

Figure 6:
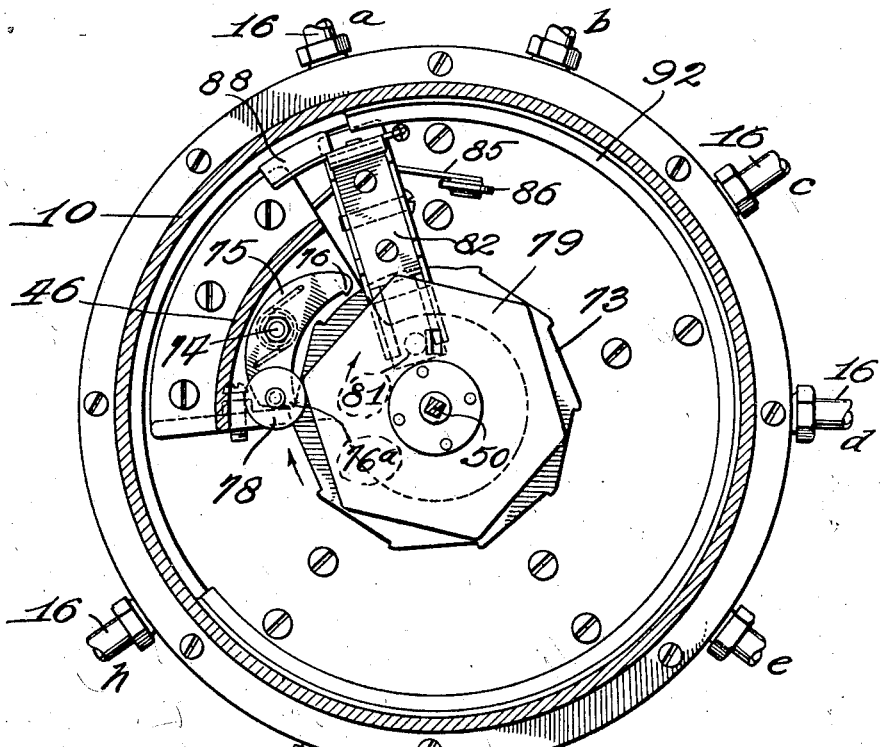
Fig. 6 is a horizontal section similar to Fig. 3 and showing the position assumed by the operating parts of the control device at the beginning of the sprinkling operations.

Referring by numerals to the accompanying drawings which illustrate a preferred embodiment of my invention, 10 designates generally, the housing for the automatic control mechanism, 11 the valves that are actuated sequentially from the automatic control and 12 the sprinkler heads which may be of any desired or conventional construction, but particularly of the type employed for sprinkling lawns, gardens, orchards, golf courses, and the like.

In Fig. 1 I have shown six sprinkler head control valves 11 associated with the automatic control head and each of said valves may have an indefinite number, for instance, from eight to twelve sprinkler heads associated therewith. A main supply duct 13, that is connected to a water main or other source of water supply under pressure, is connected to the lower portions of the housings of valves 11 and branch ducts 14 lead from the housings of the valves to distributing pipes 15 laid beneath or upon the surface of the ground and which pipes carry the sprinkler heads 12.

Leading from valve-controlled outlets in the lower portion of control housing 10 to the upper portions of the housings of valves 11, are small conduits 16, preferably copper tubes, which may be readily bent to conform with the contour of the surface of the ground that is served by the system.

Housing 10 which may be of any desired and convenient size and shape is preferably formed from cast metal and is is detachably secured to a head or plate 17. Formed in the central portion of plate 17 is a chamber 18 and detachably secured to said plate and communicating with said chamber 18 is a depending connection 19, provided with a partition 20 and the main supply pipe 13, or a branch thereof is connected to the lower portion of said connection below the partition therein. Removably seated in the connection 19, is a tubular plug 21 and the inner end thereof, which terminates on one side of the partition 20, is provided with a strainer 22, preferably wire screen of small mesh, for the purpose of preventing sand and other foreign matter from entering the chamber 18 and passing therefrom through the conduits 16 to valves 11. Formed in plug 21 on the opposite side of partition 20 from the strainer 22, is an opening 23 that communicates with the chamber in the upper portion of connection 19 and with chamber 18.

Removably positioned on top of plate 17, is a flat ring 24 in the under side of which is formed a series of radially disposed recesses 25, there being one recess for each valve 11 and one extra recess 25a, the purpose of which will be hereinafter described. The walls directly above the recesses 25 and 25a are thin so as not to interfere with the magnetic action of a permanent magnet, preferably of the horseshoe type that traverses a circular path directly above the ring 24.

Mounted for limited vertical movement within each recess 25, is an armature 26 which may be of soft iron or stainless steel and each armature is mounted on the upper end of a vertically disposed stem 27, that is non-circular in cross section, preferably hexagonal and which is loosely arranged in a vertically disposed chamber 28 that is formed in a lug or block 29 that is formed integral with and depends from plate 17. The number of lugs or blocks 29 correspond to the number of valves associated with the automatic control.

A gasket 24a that is clamped between ring 24 and plate 17 is provided with a series of apertures that register with the chambers 28, thus accommodating the stems 27 during their vertical travel and this gasket provides a fluid pressure tight seal between ring 24 and plate 17 and the housing 10 merely serves as a protective cover for the mechanism enclosed thereby and prevents such mechanism from being affected by debris, dust, rain, snow, and the like.

Formed in each lug or block 29 adjacent the recess 28, is a vertically disposed recess 30 that occupies a position parallel with recess 28 and formed through the wall between the recesses 28 and 30 is an aperture 31. The lower end of chamber 30 is closed by a screw plug 32 through which is formed an axially disposed bore 33, the upper portion thereof being reduced in diameter and a seat 34 is formed on top of plug 32 around the upper end of the reduced upper portion of bore 33.

Arranged for vertical movement within chamber 30 above plug 32, is a floating double ended valve 35, non-circular in cross section, preferably hexagonal, thus permitting water to pass lengthwise through the chamber 30 around said valve, and seated in the lower end of said valve is a non-metallic disc 36, preferably rubber, leather, fiber or the like, and which is adapted to rest on seat 34 and thereby close the upper end of bore 33.

A port 37 formed in plate 17 establishes communication between the upper end of chamber 30 and the chamber 18 in plate 17 and this port is adapted to be closed by a non-metallic disc 38 that is seated in the upper end of valve 35, when the latter is at its upper limit of movement.

Passing diametrically through the lower portion of stem 27, is a pin or screw 40 that projects through aperture 31 and the end of said pin or screw occupies a circumferential groove 41 that is formed in the intermediate portion of valve 35.

As a result of the construction just described, the vertical movement of stem 27 is transmitted to valve 35 that controls the port 37 and the bore 33 that functions as a vent or outlet port.

One end of a conventional coupling nipple 42, is seated in lug 29 and has communication with the lower portion of the chamber 28. Leading from this connection 42 to the upper portion of the housing of one of the valves 11, is a conduit 16, preferably a small copper tube which may be readily bent to conform to the contour of the surface of the ground between the automatic control head and the various sprinkling head control valves associated therewith.

Suitably secured to the central portion of plate 17 within ring 24, is a bracket 44 provided at its upper end with a flat plate 45 that functions as a table for supporting certain operating parts of the control device. This plate 45 extends radially from the centrally arranged bracket 44 and secured to the outer end of said plate is one end of a ring-shaped frame 46 that serves as a support for a shallow inverted cup-shaped housing 47; the latter providing a protection cover for a timing device 48 that is suitably suspended from the top of housing 47 and there being an opening 49 formed in the top of the housing directly above said timing device.

A screw 44a is seated in the outwardly projecting portion of bracket 44 below plate 45 and serves as an adjustable stop to limit the movement in one direction of a valve actuating magnet hereinafter more fully described.

The timing device 48 consists of a standard clock mechanism that is now being manufactured and on the market and it is characterized by the frictional mounting of the arbor, whereby the same may be manually rotated in either direction to wind or unwind the main spring of the clock or timing device.

This timing device or clock may be of the type wherein its main arbor 50 makes one revolution in a clockwise direction per hour and the spring of the clock is wound by rotating the arbor in counter-clockwise direction.

The upper portion of housing 10 is preferably contracted to form a short neck portion 51 within which is formed a partition 52 and said partition having a centrally arranged bearing 53 within which is arranged for rotation a stem 54. Secured on the upper end of stem 54 within the chamber 55 above partition 52 is an operating wheel 56 provided in its edge with notches 57 that are adapted to be engaged by a tool having a forked lower end and a handle on its upper end, that is utilized in imparting rotary motion to the stem 54. The chamber 55 that contains wheel 56 is normally closed by a hinged cover plate 58.

Detachably mounted on the lower end of stem 54 is a disc 59 and overlying said disc is a disc 60, in which is formed a spirally disposed slot 61, the length of which is approximately one and one-third convolutions (see Fig. 8). Slotted disc 60 is detachably and adjustably mounted on disc 59 by means of screws 62 that extend upwardly through the marginal portion of the upper disc 60 and the heads of which screws overlie the edge of disc 59. When the screws 62 are tightened the disc 60 is rigidly clamped to disc 59.

Suitably secured to the under side of the central portion of disc 59 is a diametrically disposed plate 63 and depending from the ends thereof are fingers 64 that project downwardly through opening 49 in housing 47 and the lower ends of these fingers occupy notches that are formed in the edge of a disc 65, the latter being suitably secured to the upper end of the arbor of clock 48 (see Fig. 9).

The construction just described provides a self-adjusting flexible coupling between the main operating stem 54 and the clock arbor.

The outer end of a lever 66 is pivotally mounted at 67 to the upper portion of housing 10 and depending from the free end of this lever is a finger 68 that projects into the spiral slots 61. This lever functions as a detent to limit the winding movement imparted to the spring of timing device 48 and restricts the running thereof to one and one-third revolutions in this particular case.

Projecting upwardly from plate 45 directly above the center of the bracket 44 is a pin 69 on which is mounted for rotation a collar 70. Secured to this collar is one end of a spiral spring 71, the outer end thereof being fixed in any suitable manner to plate 45. Mounted on the upper end of collar 70 and riveted thereto is ratchet wheel 73. Screw 72 seated in pin 69 holds the assembly just described in position so that it can freely revolve around pin 69.

Mounted for oscillatory movement on a pin 74 that projects upwardly from plate 45 adjacent the point where the bracket 46 is secured to said plate is a double ended pawl 75. Pallets 76 and 76a on the extreme ends of this pawl 75 alternately engage the teeth of ratchet wheel 73, thus functioning as an escapement and causing the ratchet wheel to move intermittently in the direction indicated by arrows, Figs. 6 and 7. The coiled portion of a spring 77 is disposed about the pin 74 with one end of said spring connected to the pawl 75 and the other end to plate 45, so as to normally exert pressure thereon that tends to move the pallet 76 on the forward end of said pawl away from the ratchet wheel 73.

Mounted for rotation on top of the rear end of pawl 75 is a horizontally disposed roller 78. Secured to the lower end of the clock arbor 50 is a hexagonal cam 79, the high portions of which are adapted as the cam rotates, to engage roller 78 and swing pawl 75 so as to move pallets 76 and 76a alternately towards or away from the ratchet wheel 73. Depending from the cam 79 is a lip 80 which, when the sprinker control is started, engages a stud 81 that is seated in and projects upwardly from ratchet wheel 73.

In the present instance I have shown the cam 79 with six high points, but it will be understood that said cam may have four, five, seven, eight, or more high points, depending upon the desired length of sprinkling periods.

Loosely connected to stud 81 is the inner end of a radially disposed arm 82 that projects beyond the edge of ratchet wheel 73. Carried by the projecting portion of said arm is a depending housing 83 that encloses the yoke portion of a permanent magnet 84, preferably of the horseshoe type. The lower ends of the arms of this magnet traverses a path in a plane just above the upper surface of the ring 24 so that as the magnet passes successively over the armatures 26 the latter and the stems 27 connected thereto are elevated and which movement necessarily elevates the corresponding valves 35.

Formed in the under side of ring 24 between bracket 44 and the adjacent recess 25 is a recess 25a practically identical with the recesses 25 and loosely mounted in said recess 25a is a piece of soft iron 26a that functions as a keeper to magnetically connect the ends of the legs of the magnet and conserve and retain the permeability of the magnet when the same is in its out-of-service position as illustrated in Fig. 5.

The construction just described permits the magnet 84 to be clamped in its housing so that the under faces of its legs are disposed in a plane slightly above the upper surface of ring 24, thus practically eliminating friction as the magnet travels from one position to another over the ring having the recesses 25 that are occupied by the armatures 26.

Projecting in opposite directions from the outer portion of the magnet housing 83 are arms 85, in the outer end portions of which are journaled small wheels 86 that ride on the top surface of ring 24 (see Fig. 10).

The outer portion of arm 82 is upturned as designated by 87 and pivoted on the outer face of said upturned end portion is a dog 88 provided on its lower forward portion with a laterally projecting flange 89.

The upper end of a retractile spring 90 is connected to the rear end of dog 88 and the lower end of said spring is connected to a finger 91 that projects from magnet housing 83. Spring 90 tends to normally swing forward end of dog 88 upward.

Formed on the inner face of housing 10 directly opposite the path of travel of the outer end of arm 82 is an inwardly projecting ledge 92 that passes around housing 10 for approximately 270 degrees and the ends of said ledge are spaced apart from the sides of plate 45 and the bracket 46 that is mounted on the outer end of said plate (see Figs. 3 and 4).

During the sprinkling function, flange 89 traverses the under surface of the ledge 92 so as to maintain the lower ends of the legs of magnet 84 immediately adjacent the upper surface of ring 24 having the recesses that are occupied by the armatures 26 and on the return of the magnet to starting position as illustrated in Fig. 6, flange 89 is positioned above ledge 92 as illustrated in Fig. 12. Under such conditions, the lower ends of the arms of the magnet are elevated with respect to the armatures 26 so that said armatures are not sufficiently influenced by the magnet during its return movement to starting position to cause valves 35 to operate.

When the system is inactive or out of service, magnet 84 occupies the position as illustrated in Fig. 5 with one side thereof bearing against the adjustable stop screw 44a and said magnet being positioned directly above the recess 25a that contains the armature or keeper 26a which functions to maintain permeability of the magnet. When so positioned, the dog 88 is positioned directly in front of one end of ledge 92 with the forward end of flange 89 positioned in a plane just above said flange and which position is due to the pull exerted by rectractile spring 90. Under such conditions the pressure of the water supply from pipe 13 and which water fills the connection 19 and chamber 18, is exerted through ports 37 onto the tops of piston valves 35 to maintain the same at their lower limits of movement, thus closing the upper ends of outlet ports 33 and maintaining stems 27 and armatures 26 at their lower limits of travel as illustrated in Fig. 12.

Under such conditions, water passes downwardly through chambers 30 around the valves 35, thence through ports 31 into chambers 28 and from thence through the various conduits 16 to the upper ends of the sprinkler head control valves 11, to hold said valve closed.

To set the control so as to start sprinkling functions, cover 58 is opened and with a suitable wrench or tool, wheel 56 is engaged and rotated, thereby imparting rotary motion to shaft 54, the lower end of which carries the disc 59 and 60. The rotary motion thus imparted is anti-clockwise and such rotary motion is controlled by the detent lever 66, the depending end 68 of which engages in spiral slot 61.

As shaft 54 is thus rotated, the flexible coupling between shaft 54 and the clock arbor 50, which coupling includes the parts 63, 64 and 65, imparts movement to the arbor of the timing device, to wind the main spring of the latter.

As this winding movement takes place, corresponding rotary motion is imparted to cam 79 which is carried by the lower end of the timing device arbor and the depending lip 80 on said cam engages stud 81 that projects upwardly from ratchet wheel 73, thereby correspondingly rotating the latter and winding spring 71 so as to store power therein.

As the ratchet wheel 73 is thus rotated, arm 82 carrying the magnet housing 83 is rotated approximately three quarters of a complete revolution, or until it occupies the position illustrated in Fig. 6. During this rotary motion of ratchet wheel 73 and magnet, the flange 89 on dog 88 rides on top of ledge 92 as illustrated in Fig. 12, thus maintaining the magnet in a slightly elevated position so that it does not effect the armature 26 while it is being moved to starting position.

At the end of the travel of the magnet as just described, flange 89 drops off ledge 92, thereby permitting dog 88 that carries the magnet to swing downward a short distance so as to position the lower ends of the legs of the magnet just above the upper surface of ring 24 that is provided with the armature containing recesses. When so positioned, the flange 89 on the reverse movement of ratchet wheel 73 and magnet will travel beneath ledge 92 as illustrated in Fig. 10 and the wheels 86 travel on the upper surface of ring 24.

When the parts have been thus shifted to starting position, the magnet occupies the position as illustrated in Fig. 6 so that it is positioned directly above the armature that is associated with the particular conduit 16a (Fig. 6), that leads to the valve 11 that controls the set of sprinkler heads that are first placed in service.

With the magnet thus positioned, the armature 26 directly beneath said magnet will be actuated and drawn upward in its recess, thereby moving the corresponding stem 27 upward and the pin or screw 40 that engages in the groove 41 of floating valve 35, will elevate the latter, thereby closing port 37 and opening port 33 in plug 32 that closes the lower end of chamber 30. With the parts so positioned the pressure of the water holding valve 11 closed conduit 16 that leads to the fitting 42 that is connected to chamber 28 and this pressure exhausts through port 31 into chamber 30 and discharges therefrom through port 33.

As this release of pressure takes place, the pressure of the water from supply pipe 13 acts to unseat valve 11, thus permitting the water supply from main 13 to flow freely through the pipe 14 that leads from valve 11 to the branch pipe or pipes 15 that carry the set of sprinkler heads 15 that are first placed in service.

The arbor 50 of the timing device 48 moves in clockwise direction so that the high points of cam 79 are successively brought into engagement with roller 78.

With the magnet at the starting position as illustrated in Fig. 6, the shoulder 76a on the rear end of pawl 75 and which functions as a pallet, engages one of the teeth of ratchet wheel 73, while the detent 76 on the forward end of said pawl is positioned between a pair of the teeth of the ratchet wheel 73 and slightly outside the path of travel thereof.

When wheel 56 is rotated in anti-clockwise direction to set the control head for service and to move the magnet 82 to starting position as illustrated in Fig. 6, one of the high points of cam 79 is moved to a position immediately adjacent roller 78 so that as the cam starts and moves in clockwise direction the straight edge of the cam between two of the high points moves past the roller, out of contact therewith.

Cam 79 is shown with six high points and if a timing device is used that causes the cam to make one complete revolution per hour, then each set of sprinkler heads 12 will function for ten minutes minus the dwell period of approxicately one-half minute. It is to be understood, however, that a cam having a greater or less number of high points may be used and that a timing device that makes one revolution in two or more hours may be used, in which latter event the sprinkling periods are of increased duration.

As the cam moves in clockwise direction past roller 78, the subsequent or next adjacent high point of the cam engages the roller and moves the same outward a sufficient distance to disengage pallet 76a on the rear end of the pawl from the shoulder on the ratchet wheel with which it has been engaged and at the same time moves detent 76 on the forward end of the pawl into the path of travel of the subsequent shoulder or tooth of the ratchet wheel.

Figure 7:
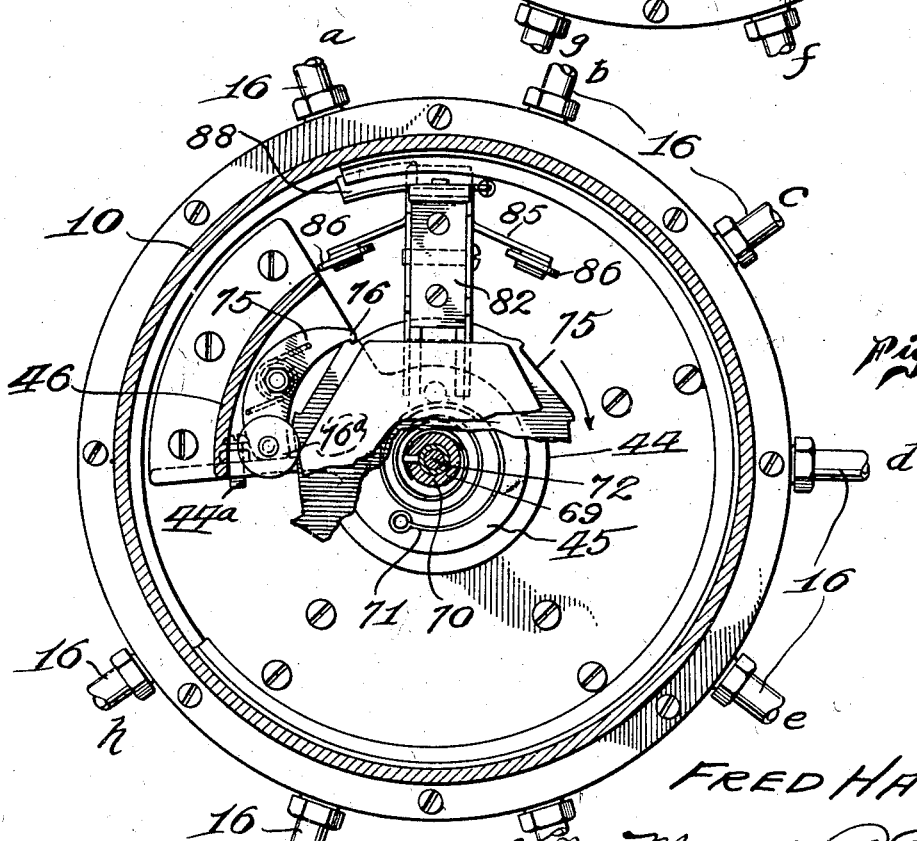
Fig. 7 is a horizontal section similar to Fig. 3 with parts broken away to show the spring forming a part of the control mechanism and with the magnet of the control mechanism in a neutral or dwell position.

As such action takes place, the power stored in spring 71 acts to impart motion to the ratchet wheel until one of the shoulders or teeth thereof is engaged by detent 76 and stopped in the position as illustrated in Fig. 7.

Under such conditions, the pawl 75 functions as an escapement to cause an intermittent movement of the ratchet wheel 73 and the magnet carried thereby and, as a result of such movement, the magnet moves successively into position above the armatures 26, which when elevated control the movements of the valves 35 and for short periods of time, the magnet occupies neutral positions which may be termed "dwells," between the armatures 26 and the valves actuated thereby and which control the flow of water to and through the conduits 16 that lead from the control housing to the sprinkler head control valves 11.

In Fig. 7, the magnet is shown in its intermediate or "dwell" position and which position is due to the fact that the detent 76 on the forward end of the pawl 75 is in engagement with one of the teeth of the ratchet wheel and it is held in such engagement for a short period of time; for instance, thirty seconds, while the high point of the cam 79 is passing roller 78. The length of "dwell" depends on the shape and length of the high points of cam 79.

This neutral or "dwell" position of the magnet is important, by reason of the fact that it prevents two of the sprinkler valves from being open simultaneously and which condition would result in a considerable drop in the pressure of the water supply and which pressure reduction might become so low as to be insufficient to overcome the friction of the differential piston in valve housing 11.

Thus, as each high point of the cam passes the roller 78, which condition is illustrated in Fig. 7, the magnet is in its intermediate or "dwell" position and after each high point of the cam passes roller 78, the spring associated with pawl 75 acts to swing the end of the pawl carrying the roller inwardly so that the pallet 76a is in position to be engaged by and function as a stop for the next adjacent tooth of ratchet wheel 73.

As the ratchet wheel makes this second movement, the magnet 84 is carried into position above the next adjacent armature 26, thereby elevating the same and correspondingly elevating valve 35 to cut off the flow of water through the second one of the ducts 16, to the second one of the valves 11 in the series, thus permitting said valve to function and permit water to flow through pipe 14 to branch pipe 15 and to the second set of sprinkler heads, with the result that the latter function to sprinkle the second area of ground that is included in the total area, that is serviced or sprinkled by the complete system.

In the drawings I have shown eight conduits 16 leading from the main control housing, said conduits being designated by the letters $a$ to $h$ inclusive and as illustrated in Fig. 3, the control head is illustrated as having eight armatures 26 that are connected to the valves that control the flow of water through said eight conduits 16 and thus it will be understood, that the magnet moves successively into position directly above the armatures that are connected to and which actuate the floating valves 35; so that, in the system as illustrated, the eight sets of sprinkler heads will be caused to function in succession, so as to sprinkle the eight ground areas that are covered by the entire system.

As the magnet in its operation moves from its position above one of the armatures to its intermediate or "dwell" position between two of the armatures and which "dwell" position involves about thirty seconds time, the armature that is relieved of the influence of the magnet, will move downward in its chamber so that stem 27 is correspondingly moved downward, thereby moving valve 35 downward to close outlet port 33 and open port 37.

As such action takes place, water from supply pipe 13 passes through fitting 19 to chamber 18, from thence through port 37 into chamber 30, thence downwardly around valve 41 through opening 31 to chamber 28 and from thence through the corresponding duct 16 to the upper end of the corresponding valve housing 11 to force said valve onto its seat.

The closing of each valve as just described, takes place while the magnet is moving from its position above one of the armatures to a position above the next adjacent armature, during which movement, the magnet stops for about thirty seconds in its neutral or "dwell" position. Thus the valve 11 that has just been functioning to permit water to flow to the sprinkler heads controlled by said valve, is permitted to completely close and consequently cut off the supply of water to its sprinkling heads, before the next adjacent valve is opened by the action of the magnet in elevating the next adjacent armature and the valve 35 associated therewith.

If, while the system is functioning, it should be found desirable or necessary to render the system inoperative, it is only necessary to apply a suitable tool to the wheel 56 and rotate the same in a clockwise direction, which operation is possible due to the fact that the arbor of clock 48 is frictionally mounted, thus permitting it to be rotated in either direction and as the wheel 56 and shaft 54 are thus rotated, the discs 59 and 60 are returned to their normal positions with the depending finger 68 on arm 66 at the inner end of the spiral slot 61 in disc 60.

By using a control disc 60 having a slot that is approximately 540 degrees in length and using a timing device that makes one revolution per hour, there is available practically 90 minutes of time which permits the use of a control head having eight outlets; each having a sprinkling period of approximately ten minutes and with seven neutral or "dwell" periods of approximately thirty seconds each.

Thus, it will be seen that I have provided a distributing valve of the time controlled type that is relatively simple in construction, inexpensive of manufacture and very effective in performing the functions for which it is intended.

Thus, it will be seen that I have provided a distributing valve of the time controlled type that is relatively simple in construction, inexpensive of manufacture and very effective in performing the functions for which it is intended.

While I have shown and described a preferred embodiment of my invention, it is to be understood that I do not limit myself to the specific embodiment herein disclosed as the construction and arrangement of the various parts of the apparatus may be modified more or less in detail without departing from the spirit of my invention, the scope of which is set forth in the appended claims.

I claim as my invention:

1. In an automatic sprinkling system, a service valve operating and controlling means comprising a housing having a fluid tight chamber provided with a pressure inlet, there being a plurality of bores adjacent said fluid tight chamber, a valve inlet for establishing communication between one end of each of said bores and said fluid tight chamber, a valve outlet establishing communication between the opposite end of each bore with atmosphere, a service port in communication with each of said bores, a moveable valve member in each of said bores, said valve members being arranged to normally close said valve outlets, an armature associated with each of said valve members, there being a second chamber in said housing, which second chamber is at no time in communication with said fluid tight chamber and said bores, a permanent magnet arranged for operation within said second chamber and adapted to traverse a path adjacent said armatures, all of said armatures being disposed so as to be subject to the attractive forces of the magnet during its travel and means for moving said magnet intermittently and thereby sequentially attracting said armatures to unseat the valve members from said valve outlets and to simultaneously close said valve inlet.

2. Automatic sprinkling system service valve control means as set forth in claim 1 and with manually operable time controlled means arranged for operation within the second chamber in said control housing for periodically positioning said magnet so as to sequentially actuate said armatures and the valves associated therewith.

3. Automatic sprinkling system service valve control means as set forth in claim 1, with manually operable time controlled means arranged for operation within the second chamber in said control housing for periodically positioning said magnet so as to sequentially actuate said armatures and the valves associated therewith and manually operable means for controlling the operation of said time controlled magnet actuating means.

4. Automatic sprinkling system service valve control means as set forth in claim 1, with manually operable time controlled means arranged for operation within the second chamber in said control housing for periodically positioning said magnet so as to sequentially actuate said armatures and the valves associated therewith and means for effecting periods of dwell for said magnet at points between its valve operating positions.

5. Automatic sprinkling system service valve control means as set forth in claim 1, with manually operable time controlled means arranged for operation within the second chamber in said control housing for periodically positioning said magnet so as to sequentially actuate said armatures and the valves associated therewith, means for effecting periods of dwell for said magnet at points between its valve operating positions and manually operable means for moving said magnet to starting position.

FRED HAUSER.